(12) United States Patent
Clemen, Jr.

(10) Patent No.: US 8,743,925 B1
(45) Date of Patent: Jun. 3, 2014

(54) METHOD AND APPARATUS FOR CREATING OR AMPLIFYING A LASER BY ACOUSTIC STIMULATION

(75) Inventor: Mark J. Clemen, Jr., Bremerton, WA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 13/274,970

(22) Filed: Oct. 17, 2011

(51) Int. Cl.
*H01S 3/09* (2006.01)

(52) U.S. Cl.
USPC .................... 372/90; 372/69; 372/89; 372/93

(58) Field of Classification Search
CPC ......... H01S 3/0953; H01S 3/095; H01S 3/09; H01S 3/1068; H01S 3/081; H01S 3/0816
USPC .............................. 372/69, 90, 39, 68, 89, 93
See application file for complete search history.

(56) References Cited

U.S. PATENT DOCUMENTS

| | | | | |
|---|---|---|---|---|
| 5,982,801 | A * | 11/1999 | Deak ................................ | 372/69 |
| 7,002,169 | B2 | 2/2006 | Thomas et al. | |
| 2003/0016716 | A1 * | 1/2003 | Mahonty .......................... | 372/55 |

OTHER PUBLICATIONS

Jarman, P., "Measurements of Sonoluminescence from Pure Liquids and some Aqueous Solutions," *Proc. Phys. Soc.*, vol. 73, pp. 628-640 (1959).

Vazquez, G. et al., "Sonoluminescence: Nature's Smallest Blackbody," *Optic Letters*, vol. 26 (2001).
Suslick, K.S. et al., "Sonoluminescence from non-aqueous liquids," *Nature*, vol. 330, No. 6148, pp. 553-555 (Dec. 10, 1987).
Flint, E.B. et al., "Sonoluminescence from Nonaqueous Liquids: Emission from Small Molecules," *J. Am. Chem. Soc.*, vol. 111, No. 18, pp. 6987-6992 (1989).
Camara, C. et al., "Sonoluminescence from a Single Bubble Driven at 1 Megahertz," *Physical Review Letters*, vol. 92, No. 12, pp. 124301-1 through 124301-4 (Mar. 2004).
Levinsen, M.T. et al., "Spectra of Stable Non-Noble Gas Single Bubble Sonoluminescence," *Physics* (Apr. 20, 2006).
Kondic, L. et al., "Ambient pressure and single-bubble sonoluminescence," *Physical Review E*, vol. 57, No. 1, pp. R32-R35 (Jan. 1998).
da Graca, J. et al., "Single Bubble Sonoluminescence from Noble Gas Mixtures," *Phys. Rev. E66*, 066301 (Dec. 6, 2002).
Crum, L.A., "Sonoluminescence," *Physics Today*, p. 22-29 (Sep. 1994).
Crum, L.A., "Synchronous Picosecond Sonoluminescence," Applied Physics Laboratory, University of Washington, Report #1LC.APL.96 (172 pages) (Oct. 10, 1996).
Putterman, S., "Sonoluminescence: Sound Into Light," *Scientific American* (Feb. 1995).

* cited by examiner

Primary Examiner — Kinam Park
(74) Attorney, Agent, or Firm — Clifford G. Cousins

(57) ABSTRACT

A laser system having an acoustic stimulator and amplifier section adjacent to the acoustic stimulator is disclosed. The stimulator is configured to apply acoustic energy to the amplifier section whereby luminescent output is produced in the amplifier section. This luminescent output may be concentrated to form a high intensity light output.

20 Claims, 7 Drawing Sheets

METHOD AND APPARATUS FOR CREATING OR AMPLIFYING A LASER BY ACOUSTIC STIMULATION

FIELD

The disclosure relates to a lasers, and more particularly to lasers using the principle of sonoluminescence.

BACKGROUND

High-powered lasers are an important tool in both the manufacturing and defense fields, having a variety of applications in each field. Such applications may include cutting and welding in the equipment manufacturing fields and in directed energy weapons in the defense field.

In the defense field, for example, high-powered lasers have been adapted to be directed against ballistic missiles. The success of the Boeing YAL-1 as a missile defense system has demonstrated that high-powered lasers may provide an effective defense against hostile, incoming ballistic missiles.

In the manufacturing industry, high powered lasers may improve manufacturing efficiency by reducing the time required to cut through an object, weld parts together or otherwise work a piece of material.

One type of high-power laser that is especially effective is a chemical laser, such as the COIL (Chemical Oxygen-Iodine Laser) or AGIL (All Gas-phase Iodine Laser), capable of producing relatively high power (potentially in the megawatt range) in the infrared spectrum. However, such lasers consume and produce a number of potentially toxic and hazardous chemicals and gases, including chlorine, iodine, hydrogen peroxide, potassium hydroxide, hydrazoic acid, and nitrogen trichloride. Because of their hazardous and toxic nature, such chemical lasers must be carefully contained.

There exists in the art a need for an environmentally friendly and non-toxic system capable of producing a high power laser.

Sonoluminescence is a phenomenon whereby a high-frequency oscillating pressure wave is applied to a liquid medium to generate gas-filled bubbles that expand and catastrophically collapse. As the bubbles collapse, the energy stored in the bubbles is released as electromagnetic energy. The released electromagnetic energy typically is in the form of visible light emitted in a spectrum that may be similar to black body radiation. The individual power of the emitted light may be low, on the order of a few watts per square centimeter.

A number of experiments (e.g., "Single Bubble Sonoluminescence from Noble Gas Mixtures," J. da Graça and H. Kojima, Phys. Rev. E66, 006301) have been conducted involving single-bubble sonoluminescence through the use of standing waves to produce static regions where local pressure transitions between high and low values corresponding to the amplitude of the fluctuating pressure wave. As the local pressure oscillates between low and high values, the size of the bubbles will increase and decrease. These experiments have shown that at high pressures and frequencies these single bubbles collapse to provide a regular pulse of sonoluminescent light lasting for approximately 40-50 picoseconds (ps). The deviation between these pulses is accurate to within approximately 50 ps, providing a clock-like synchronicity.

Various color spikes within the sonoluminescence spectrum are present depending on the gas within the bubble. These spikes may color the output of the sonoluminescent reaction to anywhere within the visible light spectrum. Further, as the bubble collapses, the temperature and pressure inside the bubble increase dramatically, which may result in a variety of chemical reactions that may change the profile of the gas within the bubble, causing color differentiation. Noble gases, such as argon, neon, xenon and the like, may be used to control the output color of light produced by sonoluminescence and reduce the chance of chemical reaction between the gas and surrounding liquid.

SUMMARY

According to one aspect, a laser system may include an acoustic stimulator and a liquid-filled chamber operatively connected to the acoustic stimulator. The acoustic stimulator may apply acoustic energy to the liquid to stimulate luminescent output within the liquid.

The liquid may be water, dodecane or ethylene glycol and the may include a gas, such as a noble gas, dissolved in the liquid.

According to further variations of this first aspect, reflective surfaces, such as mirrors, may be disposed within the chamber to form a reflective path along which stimulated light is reflected and intensified. A partially reflective and transmissive surface, such as a partial mirror, may be disposed in the reflective path to transmit a portion of the luminescent output from the chamber as a laser.

According to a second aspect, a method of producing an amplified output from a laser input is disclosed. A chamber in communication with an acoustic stimulator may be provided, the chamber having a liquid contained therein. A laser is projected through the chamber and may be reflected in a path to repeatedly project the laser through the chamber. Acoustic energy is applied to the chamber thereby causing bubbles to form therein. The bubbles are stimulated to collapse and amplify the laser. A portion of the laser is projected out of said path, thereby forming a laser output.

The liquid within the chamber may contain a dissolved gas, such as an inert gas, that forms the bubbles when stimulated at an acoustic frequency. The acoustic frequency may, for example, be a resonant frequency of the chamber that causes the bubbles to collapse. Further, the laser may pass through one of the bubbles during collapse, causing the electromagnetic output to amplify the laser.

According to a second aspect of the invention, a method of creating stimulated emission of radiation is disclosed. The method includes the steps of applying acoustic energy to a liquid-filled chamber to produce bubbles, that collapse and produce luminescence, reflecting the light from reflective surfaces in the liquid-filled chamber and projecting a portion of the light out of the liquid chamber as a laser.

According to one variation, the liquid chamber may be stimulated at a predetermined acoustic frequency and the length of the reflective path between the reflective surfaces is selected to be inversely proportional to this frequency.

According to a third aspect, a laser welding device is disclosed. The laser welding device may include a chamber containing a liquid and a gas dissolved in the liquid, an acoustic stimulator for stimulating the liquid chamber, at least one mirror within the chamber for reflecting light along a path, and a partial mirror within the chamber for reflecting a portion of the light along said path and transmitting a portion of the light to form a laser. The path directs light from sonoluminescence through bubbles formed by stimulating the liquid chamber at an acoustic frequency to intensity the light.

According to a fourth aspect, an aircraft with a laser is disclosed. The aircraft laser device may include a liquid chamber having a liquid and dissolved gas, an acoustic stimulator for stimulating the liquid chamber, at least one mirror within the chamber for reflecting light along a path, and a partial mirror within the chamber for reflecting a portion of the light along said path and transmitting a portion of the light to form a laser. The path directs light from sonoluminescence through bubbles formed by stimulating the liquid chamber at an acoustic frequency to intensity the light.

According to a fifth aspect, a method for producing a high intensity light output is disclosed. This high intensity light output is produced by providing a chamber having a liquid and dissolved gas and a plurality of mirrors forming a reflective path; providing a stimulator in communication with the chamber; stimulating the chamber at an acoustic frequency to produce sonoluminescence within the chamber; reflecting light from the sonoluminescence about the reflective path; passing the light through another bubble as sonoluminescence occurs to intensify the light; and outputting from the chamber a portion of the light through a partial mirror in the reflective path.

The features, functions and advantages that have been discussed can be achieved independently in various embodiments of the present invention or may be combined in yet other embodiments, further details of which can be seen with reference to the following description and drawings.

DRAWINGS

DESCRIPTION

Figure 1:
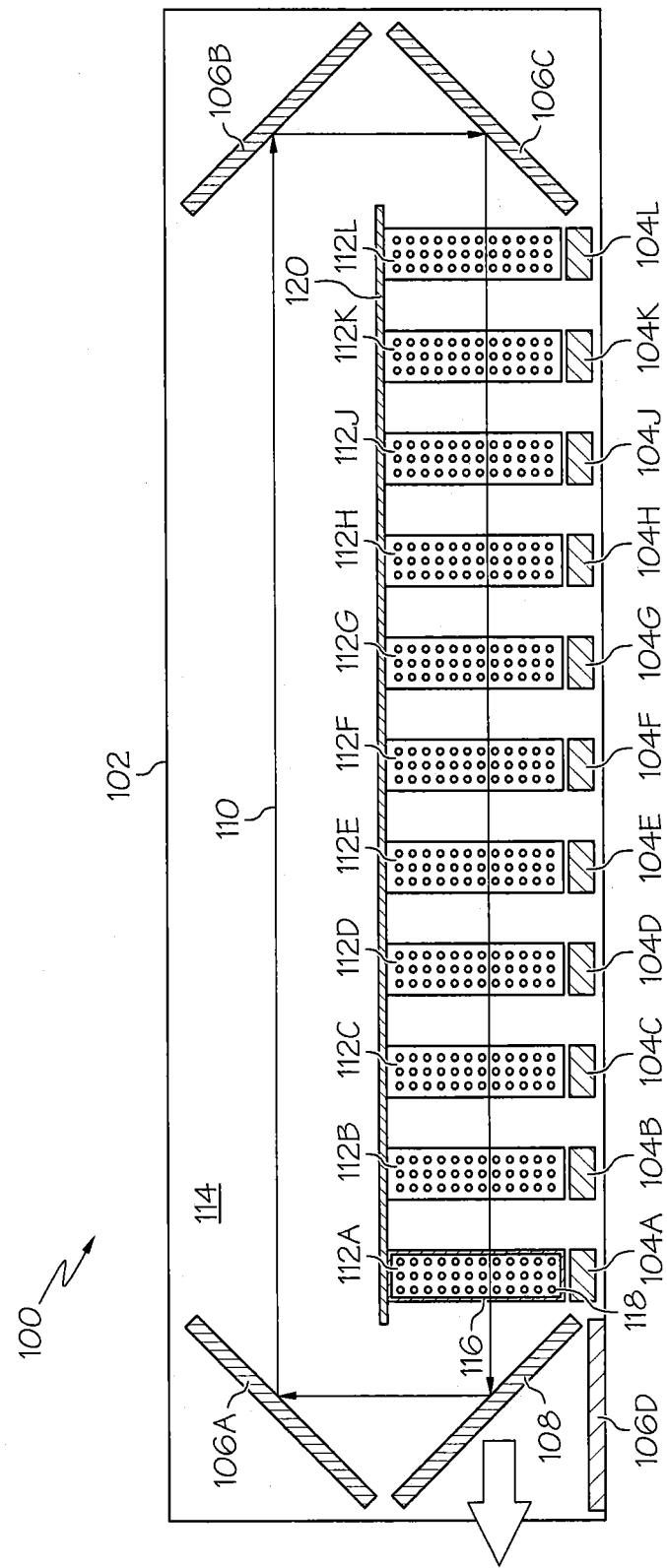
FIG. 1 is a side view of an apparatus for producing a sonoluminescent laser.

The high degree of precision and predictability in single-bubble sonoluminescence lends itself to concentration by means of a repeating light wave as illustrated in FIG. 1, for example for use as a laser. As shown in FIG. 1, the laser 100 may include a liquid container 102 containing a plurality of amplifier sections 112 (shown in FIG. 1 as 112A-L, generally designated 112) and a plurality of pressure actuators 104 (shown in FIG. 1 as 104A-L, generally designated 104) that are capable of delivering a pressure wave (or acoustic wave) at a specified frequency to stimulate each of the amplifier sections 112 at a frequency. A limited number of amplifier sections 112 are shown in FIG. 1 for purposes of scale. The liquid container 102 may be approximately 50 m long and the amplifier sections 112 may be approximately 20-30 cm wide.

Within the liquid container 102 may be a number of reflective surfaces (such as full mirrors) 106A-D that reflect incident light and a partial mirror 108 that may reflect half of incident light and transmit the remainder. As shown in FIG. 1, mirrors 106A-C and partial mirror 108 are positioned at approximately 90° angles to one another to reflect light travelling in a substantially clockwise direction in a semi-continuous path 110, with a portion of the light being transmitted through the partial mirror 108. A fourth full mirror 106D is positioned to reflect light travelling in a substantially counterclockwise direction to a clockwise direction. This mirror 106D is shown positioned outside of the path 110 formed by the three full mirrors 106A-C and partial mirror 108 such that counterclockwise travelling light reflected to a clockwise direction would be partially reflected and partially transmitted by the partial mirror 108.

Figure 2:
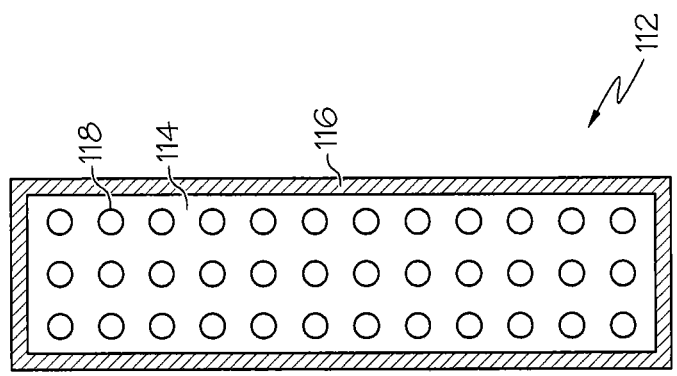
FIG. 2 is a side view of a single amplifier section.

A single amplifier section is shown in enlarged view in FIG. 2. As shown, each amplifier section 112 preferably contains a liquid 114, such as water, dodecane or ethylene glycol, and is enclosed in by a transparent barrier 116 to form an enclosure, which may be formed of glass, transparent plastic or other rigid material. The amplifier section 112 may also include a gas dissolved within the liquid 114, the section 112 being pressurized so that the gas is fully dissolved within the liquid.

Associated with each amplifier section 112 is a pressure actuator 104 (acoustic stimulator) that is substantially adjacent the section 112 so as to excite the container 112 at a frequency, preferably a resonant frequency in the ultrasonic range. This ultrasonic frequency causes bubbles 118 to form within the liquid stored in the container 102. By actuating the section 112 at a resonant frequency, a standing wave is formed within the section that forms bubbles 118 at fixed locations, causing each bubble 118 to function as a single bubble for purposes of the sonoluminescent process. The pressure actuator 104 may be any standard resonator, and may be an acoustic, electrical or mechanical device. According to one embodiment, the pressure actuator 104 is a piezoelectric resonator.

The operation of the above-described apparatus is described with reference to a single sonoluminescent bubble reaction in a single section 112 and a single oscillating electrical field (light wave), however it shall be appreciated that the reaction described may occur in a number of bubbles from a number of oscillating electrical fields.

An ultrasonic pressure wave is selected to have a pressure differential between peak and trough pressures close to but slightly below the pressure differential required for sonoluminescent excitation. The oscillating electrical field induces electrons moving in a plasma formed inside the collapsed bubble to emit light in phase with that electrical field, thereby contributing and amplifying the energy of the field.

Because the period between peaks of the standing wave for ultrasonic excitation is slow relative to the speed of the oscillating electrical field, the next pass of the oscillating field must be delayed until a bubble again forms. During this time, the oscillating electrical field may be reflected through the full mirrors 106A-C and a portion of the energy may be transmitted through the partial mirror 108. The distance around the path 110 defined by these mirrors 106A-C, 108 is selected to be the distance travelled by an oscillating field in the time between peak amplitudes of the standing wave.

According to one embodiment, the pressure actuator 104 operates at an ultrasonic frequency of approximately 2 MHz, so that the period between peak amplitudes approximately 0.5 µs. In water, one type of preferred liquid, the speed of light is reduced to approximately $2.25 \times 10^8$ m/s, and therefore the oscillating electrical field will travel approximately 110 m before the bubble has recovered. The distance around the path 110 therefore must be selected to be equal to this distance so that the oscillating electrical field picks up the most amount of energy from the sonoluminescing bubbles. Accordingly, fine adjustment of the mirror positions and angles may be necessary in order to properly calibrate the device.

The amplifier sections 112 may contain a number of liquid and gas mixtures at a variety of pressures for maintaining solubility of the gas within the liquid. The liquid may be water, dodecane or ethylene glycol and the gas permeating the liquid may be any noble gas, such as argon, helium, krypton, neon or xenon.

The above-listed liquids are selected for their characteristics of being nonhazardous, eco-friendly and having a high degree of clarity, however, it will be appreciated that any liquid capable of providing sonoluminescence in a gas bubble may be substituted for these liquids. Other examples include, without limitation, dimethyl phthalate, O-xylene, isoamyl alcohol, chlorobenzene, n-butyl alcohol, isobutyl alcohol, toluene, sec butyl alcohol, n-propyl alcohol, isopropyl alcohol, ethyl alcohol, benzene and tert butyl alcohol.

The above-listed gases are also presented as exemplary, and are selected for their non-reactive character: these gases will not react with the liquid medium and therefore the system will be less likely to degrade. The gases also exhibit preferred spectrographic profiles when sonoluminescing and therefore are selected according to the preferred color of the laser and other technical considerations. However, other gases may be substituted in place of noble gases, as described in sonoluminescent literature.

The above method of operation has described the interaction of a single sonoluminescent wave and an oscillating electrical field. In order to increase the single-pass gain of the laser output (one cycle about the path 110), it is preferred to have a number of amplifier sections 112 wherein each section contributes to the oscillating electrical field.

According to this embodiment, the amplifier sections 112 may be in-line as illustrated in FIG. 1 such that the path 110 passes through each section 112. Because the oscillating electrical field takes time to pass from one section 112 to the next, each actuator 104 must be slightly out of phase with the next, such that the section 112 actuated by a specific actuator 104 sonoluminesces at the appropriate time as the field passes through that section 112. It is undesirable to have the field pass through a bubble before collapse as a large bubble may scatter, diffract or otherwise distort the field.

As described above, each section 112 also may include a transparent barrier 116 that allows the oscillating field to pass through. This transparent barrier 116 is preferably selected to have the same or similar refractive index as the liquid 114 to avoid distortion or error due to slowing the oscillating field as it passes from one section 112 to the next. Further, the liquid container 102 may contain a liquid 114 of similar composition to the liquid 114 within each section 112 to preserve a consistent refractive index between sections.

The liquid container 102 may also contain a sound barrier 120 that may absorb and dissipate energy from the sections 112 so as to isolate each section 112 (or group of sections), thereby preventing them from influencing other sections 112. The sound barrier 120 may be a porous plate or other sound-absorbing material.

It is also preferred that the barriers 116 and liquid container 102 are formed of a transparent material, such as glass or transparent plastic. When a bubble 118 sonoluminesces on its own, the light energy is dissipated away from an origin point in a number of directions. However, when an oscillating electrical field, such as a light wave, is in the region of the sonoluminescing bubble 118 the energy is dissipated in the same direction and phase as the oscillating field. The apparatus is therefore designed such that light adverse to the oscillating field is dissipated away from the concentrated laser.

The above-described high-intensity light source may be useful in a variety of applications, including but not limited to laser welding, laser cutting, and defense operations, such as anti-ballistic missile technology. The source may also be positioned on an aircraft or other vehicle, apparatus or structure to provide for various uses.

The above-described laser 100 may be operated in either an oscillator or amplifier mode. In an oscillator mode, the laser seed is created by sonoluminescence, and therefore would have a spectrum corresponding to the sonoluminescence. As the light is intensified by the energy release of the bubble collapse a dominant range of wavelengths will emerge. These wavelengths will be more likely to extract energy from the collapsing bubbles, thereby providing a concentrated single-color laser.

In an amplifier mode, a seed laser may be provided to the system that operates at a limited spectrographic range (for example, an infrared laser, or a laser having a specific visible light color). As light from the seed laser stimulates energy to be released from the collapsing bubbles (through stimulated emission), the energy released will be in a similar phase and wavelength to the seed laser.

Therefore, when operated in the oscillator mode the output from the laser may be limited to a wavelength influenced by the gas, liquid, and emerging dominant wavelength. When operated in an amplifier mode, the output from the laser will be generally the same as the seed laser as the energy released from the collapsing bubbles will be emitted at a similar phase, wavelength and direction as the seed.

Figure 3:
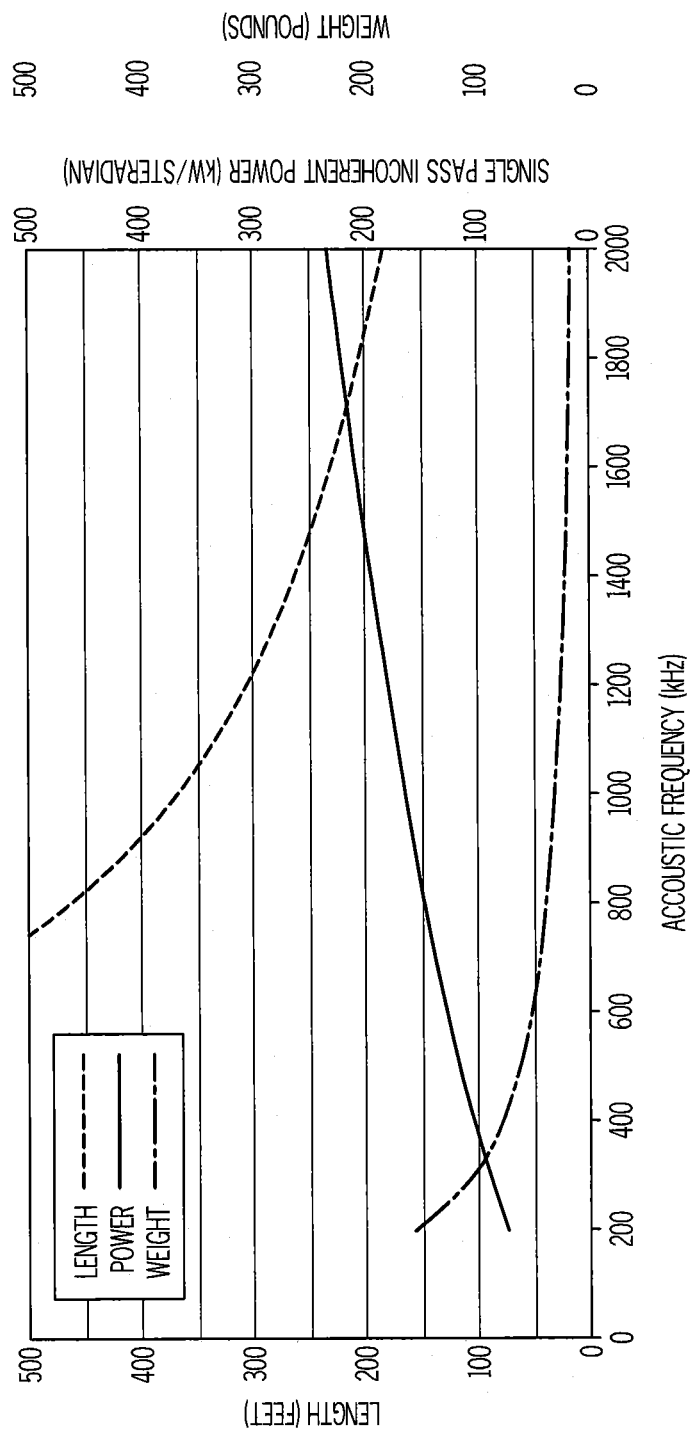
FIG. 3 is a graph illustrating various characteristics of the apparatus.

FIG. 3 illustrates the relationship between the acoustic actuation frequency (kHz) versus length of the apparatus (feet), the power from a single pass (kW/steradian) and the weight of the apparatus (pounds). As shown, the power of the device increases approximately logarithmically as the frequency increases towards 2 MHz and the weight and length of the apparatus decrease. Therefore, it is preferable to have as high of an acoustic frequency as possible in order to maximize single-pass power while reducing the size and weight of the apparatus.

Figure 4:
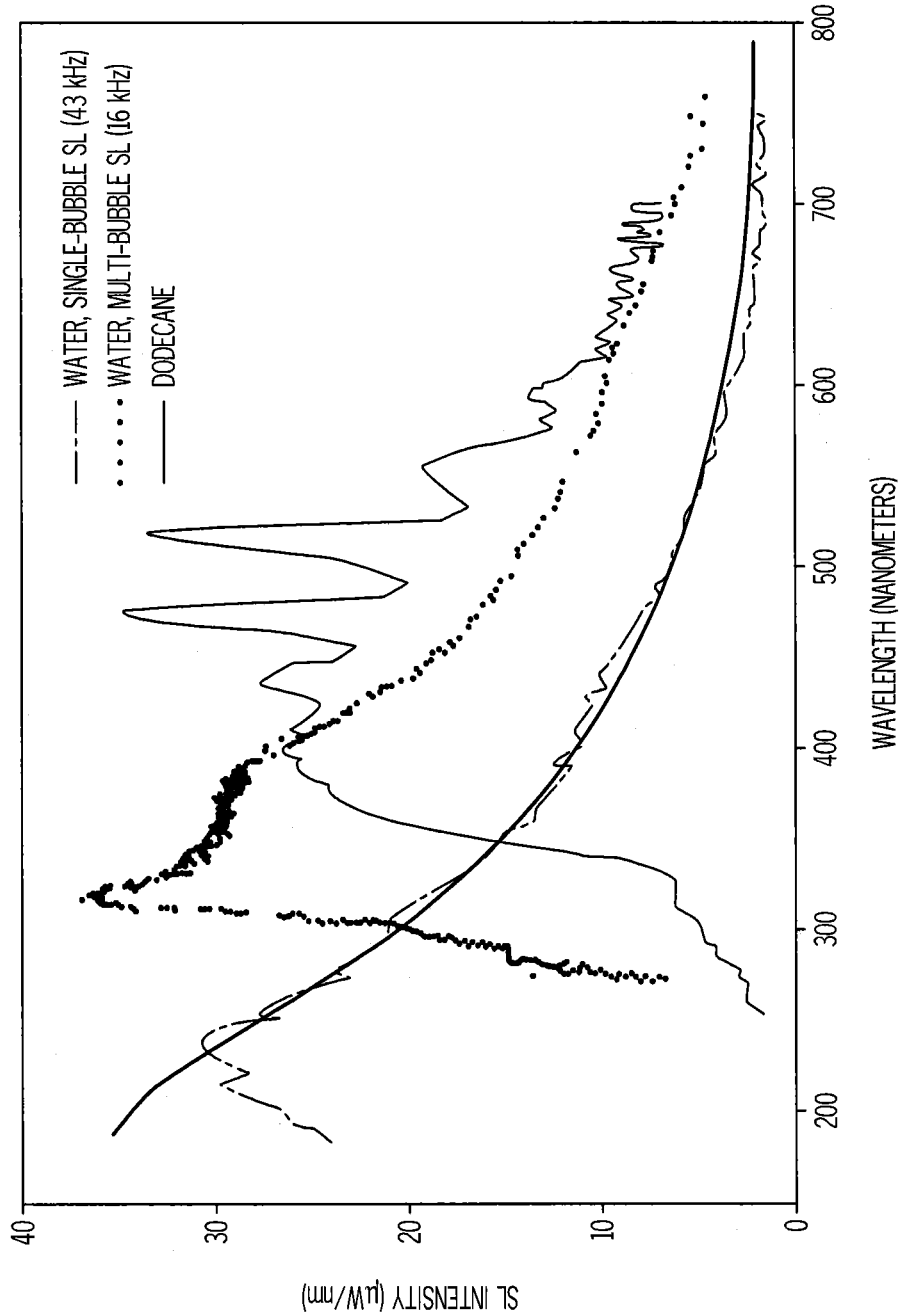
FIG. 4 is a graph illustrating various sonoluminescent spectral profiles.

FIG. 4 illustrates the sonoluminescent intensity of single-bubble sonoluminescence in water and dodecane and multi-bubble sonoluminescence in water. As shown, single-bubble sonoluminescence peaks at a low wavelength in water (approximately 250 nm) while multiple-bubble sonoluminescence peaks at a higher wavelength in water (approximately 310 nm), both of which are ultraviolet. Dodecane realizes multiple peaks, particularly at 475 and 525 nm, representing blue-green light.

Figure 5:
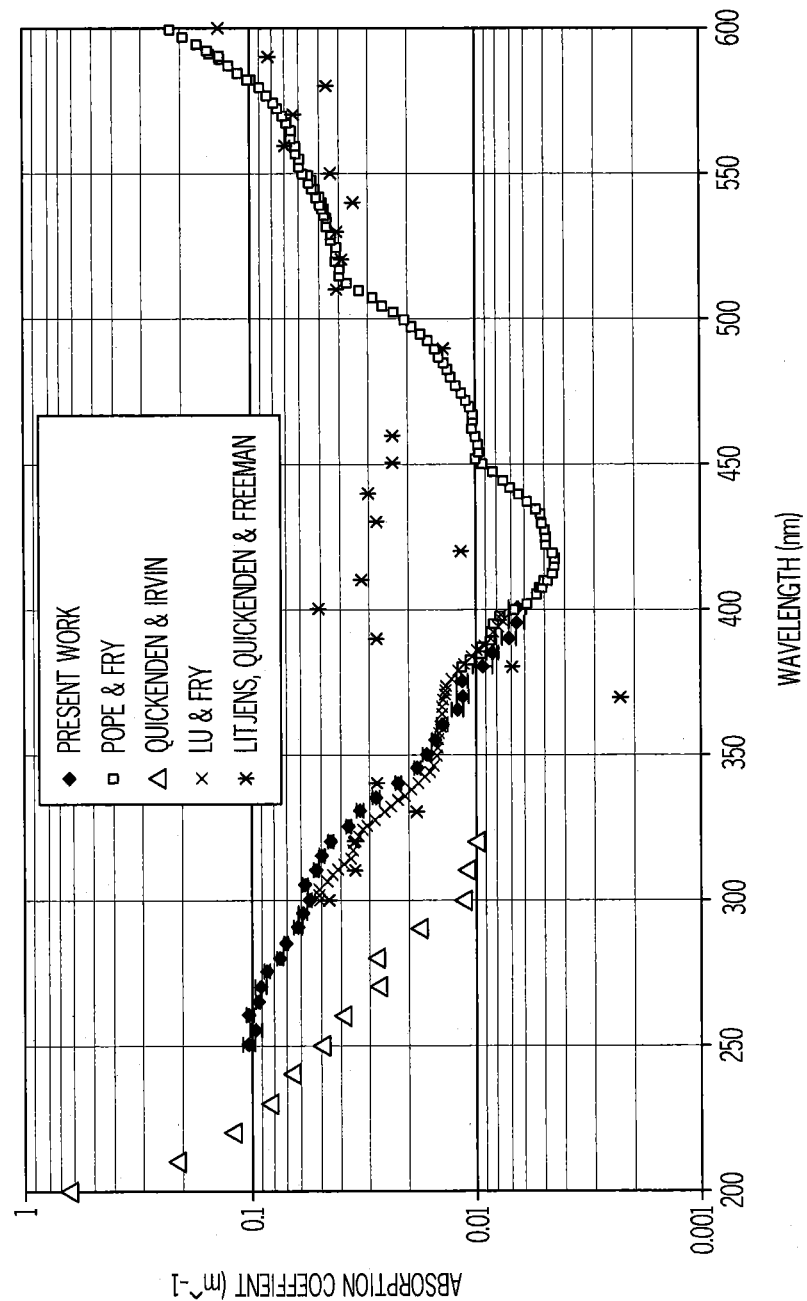
FIG. 5 is a graph illustrating the absorption coefficient of water.

FIG. 5 illustrates the absorbtion coefficient of pure water as determined by a variety of sources. As best illustrated by the present work and Pope and Fry, the minimum absorption coefficient of water is for wavelengths in the 400-500 nm range, representing visible light colors violet to blue. Therefore, it may be preferable to select a gas that includes a sonoluminescent peak at or near this range.

Figure 6:
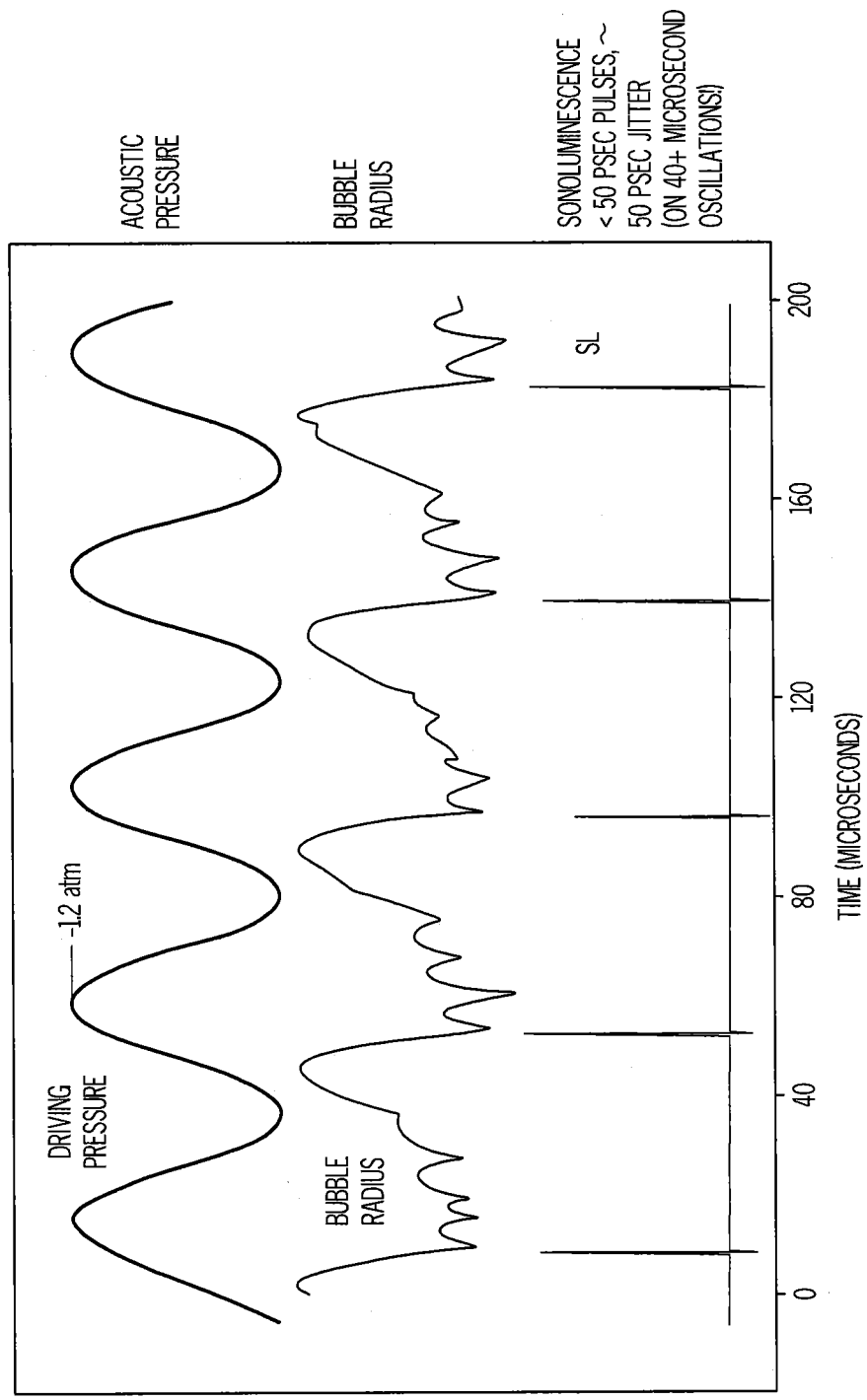
FIG. 6 is a graph illustrating the relationship between acoustic pressure, bubble radius and sonoluminescent pulses.

FIG. 6 illustrates the acoustic pressure, bubble radius, and sonoluminescence as a function of time. As shown, the maximum bubble radius slightly lags the minimum driving pressure and sharply drops to a local minimum causing sonoluminescence shortly before the maximum driving pressure. Further, while the bubbles may enlarge and collapse slightly, no sonoluminescence is realized between the local minima of the driving pressure.

Figure 7:
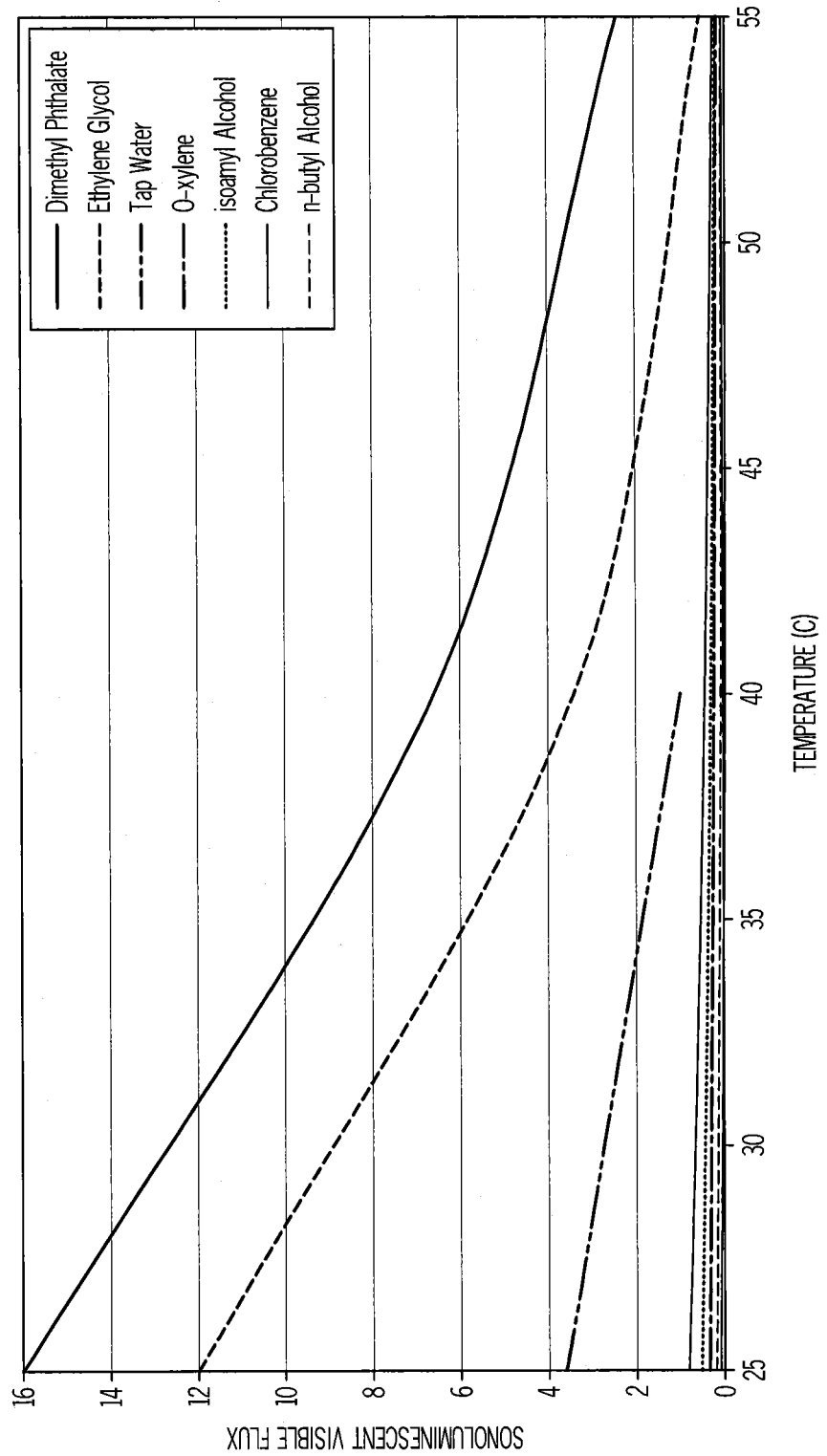
FIG. 7 is a graph illustrating sonoluminescent visible flux as a function of temperature for various fluids.

FIG. 7 illustrates the amount of sonoluminescent visible flux as a function of temperature for various fluids. As shown, the sonoluminescent visible flux is maximized at low temperatures and decreases as temperature increases. Ideal liquids appear to be Dimethyl Phthalate and Ethylene Glycol.

The above-disclosed apparatus has been described with respect to various embodiments, however those having skill in the art will appreciate that various modifications may be made to the apparatus without departing from the scope of the invention. The above-described method has also been described as having specific purposes, but those having skill in the art will appreciate that the apparatus may be used in a variety of ways without departing from the scope of the invention. The above description is intended to be exemplary and not limiting, any limitations will appear in the claims as allowed.

What is claimed is:

1. A laser system, comprising:
   an acoustic stimulator;
   an amplifier section containing a liquid and positioned adjacent the acoustic stimulator, the stimulator configured to apply acoustic energy in the form of an acoustic frequency to stimulate luminescent output within the liquid in the amplifier section; and
   a plurality of reflective surfaces configured to reflect incident light in a semi-continuous light path through the liquid in the amplifier section.

2. The laser system of claim 1, wherein the liquid is selected from the group consisting of water, dodecane and ethylene glycol.

3. The laser system of claim 1, further comprising a gas disposed within the liquid.

4. The laser system of claim 3, wherein the gas is selected from the group consisting of noble gases.

5. The laser system of claim 1, wherein a distance around the path is selected to be the distance travelled by an oscillating field in a time between peak amplitudes of a standing wave created by the acoustic stimulator in the liquid.

6. The laser system of claim 1, wherein at least one of the reflective surfaces comprises a partial mirror adapted to reflect a portion of light and transmit a remainder.

7. The laser system of claim 1, further comprising a plurality of amplifier sections in the light path.

8. The laser system of claim 7, wherein the plurality of amplifier sections contain a number of liquid and gas mixtures at a variety of pressures.

9. A method of producing an amplified output from a laser input, the method comprising:
   providing a chamber having a liquid therein and an acoustic stimulator in communication with said chamber;
   projecting said laser through said chamber;
   applying acoustic energy to said chamber having a liquid therein to create bubbles within said liquid chamber;
   stimulating said bubbles to collapse and amplify said laser;
   providing reflective surfaces configured to reflect said laser in a semi-continuous path to repeatedly project said laser through said liquid in the chamber; and
   projecting a portion of said laser out of said path.

10. The method of claim 9, wherein said liquid includes a dissolved gas that forms said bubbles.

11. The method of claim 10, wherein said gas is an inert gas.

12. The method of claim 9, wherein said acoustic energy is applied at a resonant frequency of said chamber.

13. The method of claim 12, wherein said acoustic energy stimulates said bubbles to collapse and produce electromagnetic output.

14. The method of claim 13, wherein said laser passes through one of said bubbles as said bubble collapses.

15. The method of claim 14, wherein said electromagnetic output amplifies the energy of said laser.

16. The method of claim 9, wherein said acoustic energy is applied at an acoustic frequency.

17. The method of claim 16, wherein said path is inversely proportional to said acoustic frequency.

18. A laser welding device, comprising:
   an enclosure containing a liquid and a gas dissolved in the liquid;
   an acoustic stimulator for stimulating said enclosure at an acoustic frequency to produce a sonoluminescent light from the liquid;
   at least one mirror for reflecting a plurality of mirrors configured to reflect said light along a semi-continuous path through the liquid; and
   a partial mirror for reflecting a portion of said light along said path and transmitting a portion of said light to form a laser output;
   wherein said path directs said light through said bubbles during a sonoluminescence to increase the intensity of said light.

19. An aircraft with a laser device comprising:
   an enclosure containing a liquid and a gas dissolved in the liquid;
   an acoustic stimulator for stimulating said enclosure at an acoustic frequency to produce a sonoluminescent light from the liquid;
   a plurality of mirrors configured to reflect said light along a semi-continuous path through the liquid; and
   a partial mirror for reflecting a portion of said light along said path and transmitting a portion of said light to form a laser output;
   wherein said path directs said light through said bubbles during said sonoluminescence to increase the intensity of said light.

20. A method of producing a high intensity light output, the method comprising:
   providing a chamber having an amplifier section enclosing a liquid and a gas dissolved in the liquid, the chamber having a plurality of mirrors forming a semi-continuous reflective path through the liquid;
   providing a stimulator in communication with said amplifier section for stimulating the section at an acoustic frequency to create a plurality of gas bubbles in the liquid within said section;
   stimulating the section at an acoustic amplitude to produce a sonoluminescent light from the liquid within said chamber;
   reflecting said light about said reflective path;
   passing said light through one of said bubbles as said sonoluminescent light is generated in said bubble, thereby amplifying said light;
   outputting from said chamber a portion of said light through a partial mirror in said reflective path.

* * * * *